United States Patent [19]
Pasek et al.

[11] Patent Number: 5,492,681
[45] Date of Patent: Feb. 20, 1996

[54] METHOD FOR PRODUCING COPPER OXIDE

[75] Inventors: Eugene A. Pasek, Fayetteville; Craig R. McIntyre, Conyers, both of Ga.

[73] Assignee: Hickson Corporation, Conley, Ga.

[21] Appl. No.: 34,719

[22] Filed: Mar. 22, 1993

[51] Int. Cl.$^6$ .............................. C01G 3/02; C22B 15/00
[52] U.S. Cl. .................. 423/32; 423/33; 423/604
[58] Field of Search ................................. 423/32, 33, 604

[56] References Cited

U.S. PATENT DOCUMENTS

| | | | |
|---|---|---|---|
| 1,131,986 | 3/1915 | Benedict | 423/32 |
| 2,536,096 | 1/1951 | Rowe | 423/604 |
| 2,670,273 | 2/1954 | Munn | 423/604 |
| 2,912,305 | 11/1959 | Wagner | 423/32 |
| 3,457,035 | 7/1969 | Barker | 423/604 |
| 3,492,115 | 1/1970 | Mahalla | 423/604 |
| 3,647,423 | 3/1972 | Acoveno | 423/604 |
| 3,760,070 | 9/1973 | Joice, et al. | 423/604 |
| 4,065,300 | 12/1977 | Poarch | 423/32 |
| 4,478,698 | 10/1984 | Wilkomirsky et al. | 423/54 |
| 4,944,935 | 7/1990 | Langner et al. | 423/604 |
| 5,310,533 | 5/1994 | Browne | 423/604 |

FOREIGN PATENT DOCUMENTS

| | | | |
|---|---|---|---|
| 512763 | 5/1955 | Canada | 423/604 |
| 63-11518 | 1/1988 | Japan . | |

OTHER PUBLICATIONS

Fisher, J., "Corrosion of Copper– Gold Alloys by Oxygen–Containing Solutions of Ammonia and Ammonium Salts," *Journal of the Electrochemical Society*, vol. 204, No. 5, pp. 282–286 (1956), no month.

Floridis, T. P., "Accelerated Ammoniacal Leaching of Cooper," *Metallurgical Transactions B*, vol. 6B, pp. 198–199, (1975) no month.

Guy. S., "Solubility of Lead and Zinc Compounds in Ammoniacal Ammonium Sulphate Solutions," *Hydrometallurgy*, vol. 8, pp. 251–260 (1982), no month.

Zembura, Z., "Spontaneous dissolution of Copper in Air– or Oxygen–Saturated Aqueous Ammonia Solutions," *Polish Journal of Chemistry*, vol. 59, pp. 907–913 (1985), no month.

Zembura, Z., "A Mass Transfer Model for the Autocatalytic Dissolution of a Rotating Copper Disc in Oxygen Saturated Ammonia Solutions," *Journal of Applied Electrochemistry*, vol. 20, pp. 365–369 (1990), no month.

Habashi, F., "Kinetics and Mechanism of Copper Dissolution in Aqueous Ammonia," *Berichte der Bunsengesellschaft Physik. Chem.*, vol. 67, pp. 402–406 (1962), no month.

Halpern, J., "Kinetics of the Dissolution of Copper in Aqueous Ammonia," *Journal of the Electrochemical Society*, pp. 421–428 (1953), no month.

Jayaweera, L., "Purification of Copper Ammine Solution During the Production of Copper Oxide," *the Fourteenth Australasian Chemical Engineering Conference, Chemeca 86*, pp. 95–100 (1986), no month.

Lane, R., "Kinetics of the Reaction Between Copper and Aqueous Ammonia," *J.A.C.S.*, vol. 68, pp. 1699–1704 (1946), no month.

Lu, B., "Rates of Copper Dissolution in Aqueous Ammonium Hydroxide Solutions," *J.A.C.S.*, vol. 77, pp. 6136–6139 (1955), no month.

(List continued on next page.)

*Primary Examiner*—Steven Bos
*Attorney, Agent, or Firm*—Cheryl K. Zalesky; Kilpatrick & Cody

[57] ABSTRACT

A method for producing copper oxide. In the method, a copper bearing material, aqueous ammonia, and a sufficient amount of an ammonium salt to double the rate of production of copper oxide in the absence of the salt are placed in a single vessel. The vessel is closed, and oxygen is fed into the vessel. The mixture is stirred and heated to a temperature of between approximately 70° and 130° C. to dissolve the copper bearing material into aqueous ammoniacal copper ion. The aqueous ammoniacal copper ion is reacted with the oxygen in the vessel to form solid copper oxide particles, which are then recovered.

13 Claims, 3 Drawing Sheets

OTHER PUBLICATIONS

Minghua, M., "Studies on the Reduction of Copper Ion in Aqueous Ammoniacal Ammonium Sulphate Solution by Hydrogen," *Papers Presented at the Extraction Metallurgy 1985 Symposium,* pp. 629–643 (1985), no month.

Prabhakar, S., "Studies on Ammoniacal Leaching of Oxide Ores of Copper," pp. 211–219, Journal and year of publication unknown.

Staker, W., et al., "Improved Cupric Ammonium Carbonate Leaching of Copper Scrap," *Bureau of Mines Report of Investigations 7554,* pp. 1–9 (1971), no month.

Schweitzer, *J. Prakt Chem.,* vol. 76, p. 344 (1859), no month.

Siemens, R., "Process for Recovery of Nickel, Cobalt, and Cooper from Domestic Laterites," *Mining Congress Journal,* vol. 63, No. 1, pp. 29–34 (1977), no month.

Williams, R., et al., "Cooper Concentrate Dissolution Chemistry and Kinetics in an Ammonia–Oxygen Environment," *Fundamental Aspects of Hydrometallurgical Processes, AIChE symposium Series,* vol. 74, No. 173, pp. 21–27 (1978), no month.

Wilmshurst, R., "Development of an Ammonia Leach Process for a Dolomite Copper Ore," pp. 1085–1100, Tenth International Mineral Processing Congress 1973: Proceedings of the Tenth International Mineral Processing Congress, M. J. Jones, ed., the Institution of Mining and Metallurgy (1974), no month.

Yamasaki, E., Sci. Rep. Tohoku Imp. Iniv. Ser. I, vol. 9, p. 169 (1920), no month.

Zembura, Z., "Kinetics of Copper dissolution in Aqueous Solutions of Ammonia," Roczniki Chemii Ann., Soc. Chim. Polonorum, vol. 47, pp. 1503–1510 (1973), no month.

METHOD FOR PRODUCING COPPER OXIDE

This application discloses a method for the production of copper oxide.

BACKGROUND OF THE INVENTION

Copper oxide (also referred to as cupric oxide, CuO) has a range of commercial uses, including as a reactant in analytical chemistry, in electroplating processes, in the purification of hydrogen, as a pigment in glass, ceramic, and porcelain enamels, and as a precursor to a number of copper (II) salts. One of the largest commercial applications of copper oxide is in the production of wood preservatives, including chromated copper arsenate (CCA).

Prior Methods to Produce Copper Oxide

Copper oxide has been produced commercially by, for example, electroplating, heating copper powder in air, by the thermal decomposition of cupric hydroxide, basic copper carbonate, or cuptic sulfate, and by spraying molten copper into an oxygen-containing gas.

Copper oxide is also produced by leaching copper bearing ores with ammonia or ammonium carbonate solution followed by boiling the resulting copper amine solution. The production of cupric oxide in this manner is not preferred when the material contains impurities such as zinc, lead, antimony, tin, or arsenic, because the impurities may leach along with the copper. Jayaweera, et al (Chemeca, 86, Adelaide 19–22 Aug. 1986) has reported a method to purify the copper amine liquor to remove unwanted impurities prior to isolation of cupric oxide, but the method introduces additional steps to the process. Further, the rate of copper oxide production from copper, ammonium carbonate, and ammonia is slow for commercial manufacture of the material.

U.S. Pat. No. 2,536,096 to Rowe discloses a method for the production of copper hydroxide and copper oxide, that includes contacting an aqueous solution of ammonia (saturated with cupric copper) with copper bodies in the presence of oxygen, to form insoluble films of copper hydroxide or copper oxide on the copper while agitating the copper bodies to separate portions of the films from the bodies and to expose fresh metallic copper surfaces for further reaction. When the reaction temperature is maintained below 29.4° C., the product is copper hydroxide, and when the temperature is raised to 60° C., the product is cupric oxide.

Japanese Patent Application Laid Open No. 63-11518 discloses a preparation of copper oxide that includes reacting metallic copper with oxygen in aqueous ammonia in the presence or absence of sodium hydroxide. The reaction is influenced, among other things, by reaction temperature, oxygen partial pressure, and slurry concentration.

U.S. Pat. No. 3,647,423 discloses a method for the production of copper oxide, nickel oxide, and zinc oxide that includes leaching copper, nickel, or zinc bearing materials with an aqueous ammonia-ammonium carbonate solution at an elevated temperature and under a partial pressure of oxygen. The leach liquor is separated from the insoluble residue and contacted with hot gases to cause rapid decomposition of the metal ammonium carbonate into a gas/solids mixture. The resulting metal carbonate or metal oxide powder is then separated and recovered from the gas.

It is desirable for certain applications that copper oxide be in the form of an average particle size ranging from approximately 10 to 100 microns, and preferably, between 5 or 10 to 20 or 30 microns. If the copper oxide average particle size is smaller than 10 microns, it cannot overcome capillary suction pressure during vacuum filtration and thus is not condusive to continuous vacuum filtration, and if greater than approximately 100 microns, subsequent reactions with the copper oxide product are slow.

It is also desirable to have a method for the commercial production of copper oxide that can be carried out efficiently in a relatively short amount of time, preferably, several hours.

Methods to Dissolve Copper

There have been a substantial number of publications on the subject of the dissolution of copper metal, as opposed to the production of copper oxide, under ammoniacal conditions. It is known that metallic copper dissolves in the presence of ammonia and air to form ammoniacal copper hydroxide. If sufficient ammonia and oxygen are available, the reaction will stop only after complete dissolution of the copper metal. U.S. Pat. No. 1,131,986 to Benedict discloses a method to remove copper from ores containing metallic copper that employs this reaction scheme.

The kinetics of the copper dissolution reaction was first studied by Yamasaki (E. Yamasaki, Sci. Rep. Tohoku Imp. Univ. Ser. I, 9, 169 (1920)), and later by many others (R. W. Lane and H. J. McDonald, JACS, 68, 1699 (1946); J. Halpern, J. Electrochem. Soc., 100, 421 (1953); J. I. Fisher and J. Halpern, J. Electrochem. Soc., 103, 282 (1956); B.C. Y. Lu and W. F. Gordon, JACS, 77, 6136 (1955); F. Habashi, Ber. Bunsengesellschaft physik. Chem., 67 (4), 402 (1963); Z. Zembura and A. Maraszewska, Roczniki Chem., 40, 1149 (1966). ibid, Polish J. of Chem., 59, 907 (1985); R. D. Williams and S. D. Light, American Inst. Chem. Eng., 21 (1978); Z. Zembura, A. Piotrowski, and Z. Kolenda, J. Applied Electrochem., 20, 365 ( 1990 ) ).

Schweizer (J. Prakt Chem. 76, 344 (1859)) reported that ammonium ion enhances the rate of copper dissolution in aqueous ammonia solutions. Yamasaki demonstrated that ammonium ion from ammonium sulfate has an effect on the rate of copper dissolution. He also determined that small amounts of sodium hydroxide increase the rate of copper dissolution, whereas, large quantities of sodium hydroxide suppress the rate of dissolution.

The kinetics of dissolution of copper over a wide range of $NH_3$ and $NH_4+$ concentrations, oxygen pressures, temperatures, and stirring velocities was reported by Halpern (J. Electrochem. Soc., 100, 421 (1953)). It was determined that the rate of dissolution was proportional to the surface area of the copper, and, at low oxygen pressures, was determined by the transport of dissolved oxygen to the surface. When the pressure of oxygen was increased, the chemical reaction at the surface became rate-controlling. The kinetic study investigated both ammonium acetate and ammonium sulfate and determined that the rate increases in a linear manner with concentration of the ammonium salts. Addition of sodium sulfate did not enhance the rate of copper dissolution, and therefore, the rate enhancement caused by ammonium sulfate was attributed to the ammonium ion.

It is an object of the present invention to provide a method for the production of copper oxide that affords a high rate of reaction and that is suitable to large scale manufacture of the product.

It is also an object of the present invention to provide a method for the production of copper oxide that provides the product in an average particle size of between approximately 10 and 200 microns.

SUMMARY OF THE INVENTION

A method is disclosed for the production of copper oxide that includes reacting:

i) a copper bearing material;

ii) oxygen;

iii) ammonia; and iv) an ammonium salt in a concentration that provides a production rate of copper oxide that is at least approximately twice that of the same reaction in the absence of the ammonium salt.

It has been discovered that while certain ammonium salts significantly enhance the rate of copper oxide production, other ammonium salts, including ammonium carbonate, have little rate enhancing effect under the same conditions. Therefore, the choice of ammonium salt used in the reaction has a very important effect on the efficiency of commercial production of the product.

The process disclosed herein generates high quality copper oxide in a short reaction time. The average particle size of the product will vary based on the selection of the reaction parameters, including temperature, ammonia, and ammonium salt concentration.

In a preferred embodiment, the method is carried out at a temperature ranging from 70°–130° C., and more typically between 90°–100° C., in a closed vessel with a partial oxygen pressure of between 5 and 55 psig.

DETAILED DESCRIPTION OF THE INVENTION

Figure 1:
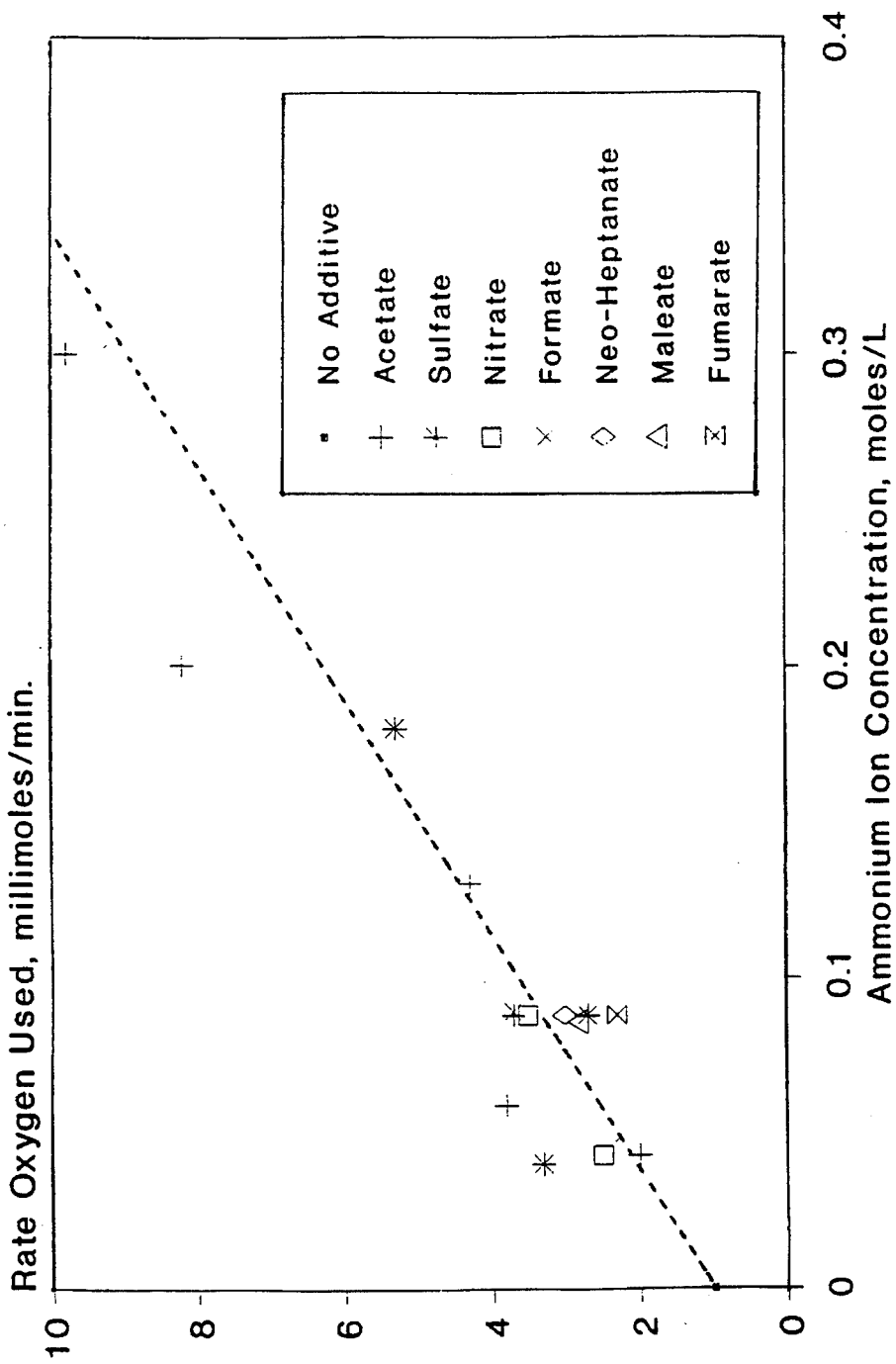
FIG. 1 is a graph that illustrates the effect of ammonium salt concentration in moles/liter on the rate of oxygen consumption in millimole/minute for the production of copper oxide.

A method for the production of copper oxide is provided that, in a preferred embodiment, efficiently produces copper oxide of average particle size ranging between 10 and 100 microns. In one embodiment, copper oxide is produced in a closed vessel that releases no waste to the environment. The rate, and thus efficiency of this process, depends on a number of factors, including purity and surface area of the copper bearing material, selection of ammonium salt, mixing rate, dispersion and source of oxygen, temperature and pressure of reaction, and ratio and concentration of components.

It has been discovered that certain ammonium salts can increase the production rate of copper oxide by as much as two times or more that of a reaction run under the same conditions and with the same reactants but in the absence of the ammonium salt. Other ammonium salts, including ammonium carbonate, that has been widely used in the past as a reactant in metallic copper dissolution processes, have little effect on the production rate of copper oxide. This could not have been predicted based on the references in this art area.

Source of Copper

Any copper bearing material can be used in this process that provides copper oxide of the desired purity. In one embodiment, pure metallic copper is used. Impure forms of copper, such as #1 and #2 scrap copper metal, can also be used. #1 Scrap copper metal typically contains approximately 99% copper, and #2 scrap metal typically contains approximately 97% copper, but this can vary somewhat among suppliers. #2 Scrap metal is often recycled copper wire that has been stripped of its insulation, and chopped into particles. Scrap metal can include any number of inorganic impurities, including but not limited to aluminum, iron, lead, tin, cadmium, nickel, chromium, and zinc. Scrap metal also sometimes includes organic impurities such as cutting grease.

The use of high purity starting materials, including high purity copper, provides high purity copper oxide. Lower grade copper is less expensive than metallic copper, however, and therefore, if a certain amount of impurity can be tolerated in the final product, lower grade copper may be preferred as a starting material. Further, a number of impurities, including but not limited to lead, aluminum, and iron do not dissolve appreciably under certain ammoniacal conditions, and therefore may not extensively contaminate the final product, if appropriate reaction conditions are selected.

EXAMPLE 1

Dissolution of Lead from #2 Scrap Copper

Experiments were performed to evaluate whether selection of the appropriate reaction conditions can affect the amount of lead that leaches from #2 scrap copper under ammoniacal conditions. The reactions were carried out at 100° C., 1200 rpm, and 50 psi oxygen for approximately 180 minutes. The results are set out in Table 1.

TABLE 1

| THE EFFECT OF REACTION CONDITIONS ON THE LEVEL OF LEAD IMPURITY IN THE CUPRIC OXIDE. | | | |
|---|---|---|---|
| Copper Metal #2, g | 193.8 | 193.8 | 193.8 |
| Ammonia (29 wt. %), g | 391.2 | 391.2 | 97.8 |
| Ammonium Acetate, g | 13.9 | | |
| Ammonium Sulfate, g | | 24.2 | 24.2 |
| Water, g | 915 | 915 | 915 |
| Copper Oxide Impurities Lead, ppm | 14,600 | 3,340 | 440 |

Any shape of copper can be used in this method to produce copper oxide that produces the desired product. Nonlimiting examples of forms of copper that can be used include ingot, sheet, rod, wire, tubing, shot, powder, nuggets, chop, crystals, and whiskers, and copper bearing three-dimensional objects, in bulk or chopped as desired. The surface area of the copper used in the reaction will effect the rate of reaction; the greater the surface area, the greater the rate. As discussed below, the rate of copper oxide formation in turn affects the average particle size of the product. Therefore, under constant conditions, the selection of the particle size of the copper bearing material affects the resulting particle size of the product.

In a preferred embodiment, the copper is shredded, chopped, crushed, or ground to an appropriate length, typically ranging from approximately ⅛ to ½ inch, prior to use.

Ammonia

Ammonia is used in the reaction to facilitate the dissolution of copper for subsequent oxidation to CuO in solution. Copper is converted to a copper tetraammine complex on attack of the metal by ammonia, according to the following equations.

Overall Reaction (1) $Cu + \frac{1}{2} O_2 \rightarrow CuO$

Oxidation/Reduction at Copper Surface (IIa) $Cu + 4NH_3 \rightarrow Cu(NH_3)_4^{2+} + 2e^-$
(IIb) $\frac{1}{2} O_2 + H_2O - 2 e^- \rightarrow 2 OH^-$

Cuptic-Cuprous Equilibrium (IIIa) $Cu(NH_3)_4^{2+} + Cu \rightarrow 2 Cu(NH_3)_2^+$
(IIIb) $Cu(NH_3)_2^+ + 2 NH_3 \rightarrow Cu(NH_3)_4^{2+} + e^-$

Net Reaction (IVa) $Cu + 4NH_3 + \frac{1}{2} O_2 + H_2O \rightarrow Cu(NH_3)_4(OH)_2$
(IVb) $Cu(NH_3)_4(OH)_2 + HEAT \rightarrow CuO + 4 NH_3 + H_2O$ Contemplated equivalents of ammonia are other amines that perform essentially the same function as ammonia in the process. Methanolamine is oxidized to glycine under the process conditions, and therefore is not appropriate for use as the amine to produce copper oxide using this method. Alkylamines, including $C_1$ to $C_{20}$ alkylamines, may be substituted for ammonia, however, such substitution tends to increase the cost, odor, and hazard potential of the process.

Ammonia is charged to the reaction vessel in any ratio to copper metal that produces the desired product. In a typical embodiment, a molar ratio of ammonia ranging between 0.05 and 4 moles to mole of copper metal is used, and more typically between 0.1 and 2, or more narrowly, between 0.2 and 0.5. In one production embodiment, approximately three times the molar ratio of ammonia to mole of copper metal is used.

One advantage of this procedure to make copper oxide described herein is that less than the stoichiometric amount of ammonia as indicated in the above equation (4 moles of ammonia to 1 mole of copper) can be used. It appears that as soon as a small amount of metallic copper is dissolved, it is converted to copper oxide, and the ammonia is liberated and made available to dissolve more copper. Because of this, both solid metallic copper and solid copper oxide are present in the reaction mixture as the reaction proceeds to completion, and only a small amount of ammonia is needed to continue the rapid and continuous conversion of metallic copper to product.

Residual ammonia in the final copper oxide cake can be removed by washing the cake with water. This washing process, however, may increase the final moisture content of the filtered oxide, and will increase the amount of water used in the reaction.

When this process is carried out in a closed vessel, it is important to limit the amount of ammonia used to that which will not have a vapor space ammonia concentration that is in ammonia's flammability range.

Ammonium Salt

The desired ammonium salt, and ammonium salt concentration, that is used in the commercial scale process for the production of copper oxide should provide a production rate of copper oxide that is at least approximately twice that of the same reaction in the absence of the ammonium salt.

A variety of ammonium salts were evaluated to determine which, if any, met this requirement, and additionally, which would afford a commercially useful particle size of product.

EXAMPLE 2

Evaluation of Ammonium Salts

The following ammonium salts were tested for their ability to enhance the rate of copper oxide formation: ammonium acetate, ammonium carbonate, ammonium formate, ammonium fumarate, ammonium glycolate, ammonium neo-heptanoate, ammonium maleate, ammonium nitrate, ammonium oxalate, ammonium sulfate, and monoammonium phosphate.

Laboratory experiments were conducted using a Bench Scale Reactor, Model No. 2000-Y-100-PFTN. The reactor was fitted with an oxygen delivery system, multiblade stirrer, and heating mantle/controller. The oxygen use was determined by weight of oxygen consumption.

The reaction mixture contained 193.8 grams (3.05 moles) of metallic copper #1 bright stock, 391.2 grams aqueous ammonia (29 wt. %), and 915 grams of water. The oxygen regulator pressure was adjusted to 20 psig, the rpm of the stirrer was set at 1400–1600 rpm, and heating initiated. When the reactor reached the designated temperature (100°–105° C.), the oxygen regulator was adjusted to give 17 psig oxygen partial pressure. The reaction was maintained at constant temperature until approximately 3 moles of oxygen (48 grams) were consumed. The stir rate for the ammonium acetate experiments was maintained between 1500 and 2100 rpm.

Figure 2:
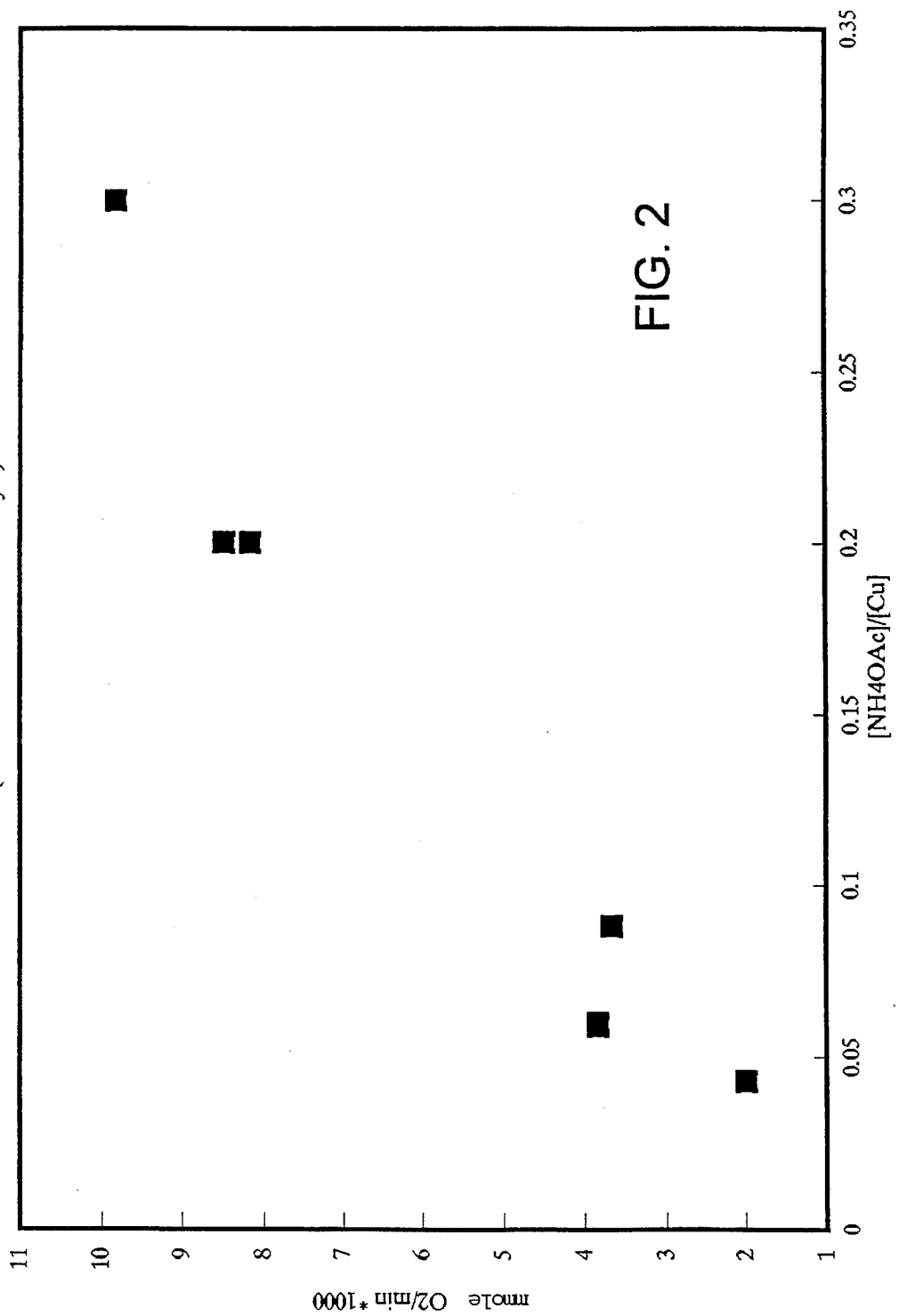
FIG. 2 illustrates the effect of the molar ratio of ammonium acetate to copper on the production rate of copper oxide measured as mmole $O_2$ consumed per minute x 1000.

The results of these experiments are provided in Tables 2 and 3, which provide both the actual rate of production of copper oxide for each run, and comparative normalized rates in parenthesis, wherein the reaction carried out with no ammonium salt is assigned a value of 1.0. The estimated error in the data presented in Tables 2 and 3 is roughly 5%. FIG. 1 is a graph of the ammonium salt concentration in moles/liter for selected rate enhancing ammonium compounds versus the rate of oxygen consumption in millimole/minute for this reaction. FIG. 2 illustrates the effect of the molar ratio of ammonium acetate to copper on the production rate of copper oxide measured as mmole $O_2$ consumed per minute x 1000. It was discovered that while certain ammonium salts enhance the rate of copper oxide formation, others do not. It was particularly surprising to find that ammonium carbonate, which is standardly used to dissolve metallic copper in the metallurgy field, does not significantly effect the rate of copper oxide formation.

The data also indicates that there is a direct relationship between oxygen consumption and cupric oxide formation. Oxygen consumption, and thus cupric oxide formation, is linear with respect to time.

TABLE 2

THE EFFECT OF AMMONIUM SALT CONCENTRATION ON THE RATE OF REACTION FOR AMMONIUM SALTS THAT ENHANCE THE RATE OF COPPER OXIDE FORMATION.

| Ammonium Salt | Conc. mole mole Cu | Rpm | CuO Rate, mmoles/min. |
|---|---|---|---|
| Acetate | 0.043 | 1500 | 12 (2.0) |
|  | 0.059 | 2100 | 23 (3.8) |
|  | 0.088 | ** | 22 (3.7) |
|  | 0.13 | 2100 | 26 (4.3) |
|  | 0.20 | 2000 | 49 (8.2) |
|  | 0.30 | 2000 | 59 (9.8) |
| Formate | 0.089 | 1500 | 22 (3.7) |
| Fumarate* | 0.044 | 1500 | 14 (2.3) |
| Neo-heptanoate | 0.088 | 1500 | 16 (2.7) |
| Maleate* | 0.043 | 1500 | 17 (2.8) |
| Nitrate | 0.043 | 1500 | 15 (2.5) |
|  | 0.088 | ** | 21 (3.5) |
| Sulfate* | 0.020 | 1600 | 20 (3.3) |
|  | 0.044 | ** | 16 (2.7) |
|  | 0.090 | 2000 | 32 (5.3) |
|  | 0.18 | 2000 | 33 (5.5) |
| No Additive | 0.00 | 2000 | 6 |

*Indicates ammonium salts of dibasic acids. For these salts, the ammonium ion concentration in solution is twice the amount of the counteranion concentration.
**None recorded

TABLE 3

RATE OF COPPER OXIDE FORMATION IN PRESENCE OF AMMONIUM SALTS THAT DO NOT APPRECIABLY AFFECT RATE OF REACTION.

| Ammonium Salt | Conc., mole/mole Cu | O Rate, moles/min. |
|---|---|---|
| Carbonate | 0.088 | 9 (1.5) |
| Glycolate | 0.088 | 6 (1) |
| Phosphate | 0.043 | 6 (1) |
| Oxalate | 0.043 | 10 (1.7) |

The ammonium salt selected to enhance the rate of reaction should also typically not be unduly corrosive to production equipment or toxic to humans or the environment. As an example, ammonium chloride can be corrosive to metal reactors under certain conditions. Ammonium formate can be toxic under certain conditions. The ammonium salt that is selected should also not be oxidized under the conditions of use.

Additional examples of ammonium salts that may be suitable rate enhancers in this reaction are ammonium alkanoates (typically $C_1$ to $C_{20}$), ammonium benzoates, ammonium sulfonates, ammonium phosphonates, ammonium chlorates and ammonium salts of other aromatic or heteroaromatic carboxylic acids.

The choice of ammonium salt will also affect the rate and extent of precipitation of impurities. For example, lead impurities can be converted to lead acetate in the presence of ammonium acetate. The lead acetate forms light grey films on the process equipment which ultimately must be disposed of as hazardous waste. The production of lead acetate also decreases the efficiency of the reaction by removing acetate from the reaction solution. Lead does not appear to react as readily with ammonium sulfate as it does with ammonium acetate, and therefore, if it is desired to minimize lead contamination in the product, ammonium sulfate may be preferred over ammonium acetate as the ammonium salt in the reaction mixture.

The ammonium salt can be added to the reaction mixture in any convenient manner, including through introduction as a preformed salt or preparation in situ by the addition of the corresponding acid to aqueous ammonia. Any amount of ammonium salt can be used in the reaction that produces the desired product. In a typical embodiment, a molar ratio of ammonium salt ranging between 0.005 and 1 mole to mole of copper metal is used, and more typically between 0.02 and 0.1, preferably 0.03 to 0.06.

Oxygen

Any source of oxygen, including air, can be used to produce copper oxide using this process. In a preferred embodiment when using a closed vessel, pure oxygen is used to prevent the build up of pressure inside the vessel by unreacted gases such as nitrogen. In an open vessel, lower concentrations of oxygen can be used, however, the lower oxygen concentration will in general decrease the rate of formation of copper oxide.

Oxygen can be introduced into the reaction mixture in any appropriate manner, preferably under the surface of the reaction mixture. The gas should be introduced at a positive pressure with respect to the internal pressure of the vessel to prevent back-up of the mixture into the gas pipe. In a system such as that illustrated in FIG. 2, most of the oxygen introduced does not reach the vapor space in the system (the space above the reaction mixture), because it reacts with copper ion as it passes through the reaction mixture. In this embodiment, the vapor space can be filled with oxygen, or alternatively, can be filled with nitrogen or other inert gas if desired.

The upper bound on the gas pressure is limited only by the ability of the vessel to withstand the pressure and the flammability of the gas mixture produced. In one embodiment, the oxygen is introduced into the vessel at a pressure of between 5 and 100 psig, and more typically, between 30 and 55 psig. The oxygen pressure will affect the rate of reaction. The higher the oxygen pressure (up to its saturation point), the faster the production of copper oxide. However, in general, the faster the rate of reaction of oxygen with copper ion, the smaller the average particle size produced. Therefore, an oxygen flow rate can be selected that provides the desired balance of speed of reaction and average particle size of product.

In one embodiment, the stoichiometric amount of oxygen needed for reaction is calculated based on the weight and purity of the copper charged to the vessel, and the specified amount of oxygen, or a calculated excess, introduced into the vessel. In an alternative embodiment, oxygen is introduced until it is determined that the reaction mixture has stopped absorbing the gas. The amount of oxygen that has reacted with copper ion can be determined by weighing the reaction mixture before and after oxygen introduction.

Temperature and Time of Reaction

The reaction of oxygen with copper in the presence of ammonia and the selected ammonium salt is exothermic. Heat must be applied however, to initiate the reaction. In a typical reaction scenario, the reaction components are heated to a temperature between 70° and 130° C., and more typically between 90° and 110° C. until the reaction is initiated. During the reaction, the reaction vessel can be cooled by any appropriate means to maintain the temperature in this range, for example, a water jacket.

The time necessary for completion of reaction will vary depending on the oxygen pressure, size of copper particles used, temperature of reaction, stir rate, purity of starting materials, and ammonia and ammonium salt concentration. Under typical conditions, the reaction is completed in a number of hours.

The optimal stir rate can be determined for any process design. In general, a pumping rate in excess of 5300 gpm gives sufficient agitation.

Particle Size of Copper Oxide

It is desired to obtain copper oxide particles ranging in average size from approximately 10 to 100 microns. In a preferred embodiment, copper oxide particles are formed that range in average size from 5 or 10 to 20 or 30 microns, and more preferably, between approximately 10 and 20 microns. This particle size is particularly useful because it is easy to filter, retains a low moisture content after filtering (<15%), and is not small enough to cause dusting. Typically, particles that are smaller than this may not easily be isolated by filtration or centrifugation due to blinding (clogging of the pores) of the filter pad or bag filter or other devices used for collection. Further, small particles hold a significant amount of moisture, and if the retained moisture contains impurities, these impurities may be difficult to separate from the product.

EXAMPLE 4

Effect of Process Conditions on Particle Size

A pilot plant experiment was conducted to determine the effect of process conditions on the average particle size of copper oxide. The experiments were carried out using a 10 gallon autoclave, Chemineer S/N 1-36261-1 model 10-J-150-DLTN. The experimental conditions were typically: average pressure of 33 psig, 90° C., and 450 rpm. As indicated in Table 4, copper oxide of average particle size between approximately 10 and 20 microns can be obtained by selection of the appropriate reaction conditions, including the selection of the concentration of ammonia, concentration of ammonium salt, and reaction time.

TABLE 4

THE EFFECT OF REACTION CONDITIONS ON THE AVERAGE PARTICLE SIZE OF CUPRIC OXIDE

| Copper Metal #2, lbs. | 10.77 | 15.00 | 15.00 |
|---|---|---|---|
| Ammonia, mole/L | 1.25 | 2.27 | 2.59 |
| Ammonium Acetate, mole/L | 0.144 | 0.272 | 0.313 |
| Water, lbs. | 70.24 | 52.10 | 59.00 |
| Time of Reaction, mins. | 145 | 90 | 104 |
| Copper Oxide Properties | | | |
| Compacted Bulk Density, g/cc | 2.44 | 3.24 | 3.26 |
| Median Particle Size, microns | 8.83 | 16.41 | 13.24 |

Manufacturing Process Conditions for Copper Oxide

In the process for producing copper oxide disclosed herein, solid copper metal dissolves over time into aqueous ammoniacal copper ion, that over time is converted to solid copper oxide particles by reaction with oxygen. At any point in time during the reaction sequence there can be both solid copper bearing material and solid product in the reaction mixture.

The process can be carried out on a manufacturing scale in either batch or continuous equipment. In the batch process, the reaction is not stopped until all of the copper bearing material has been converted to solid copper oxide, that is recovered by filtration. In a continuous process, the solid copper oxide product is isolated and separated by exploitation of a physical or chemical difference between the solid copper bearing material and the solid copper oxide product, such as a density difference.

Figure 3:
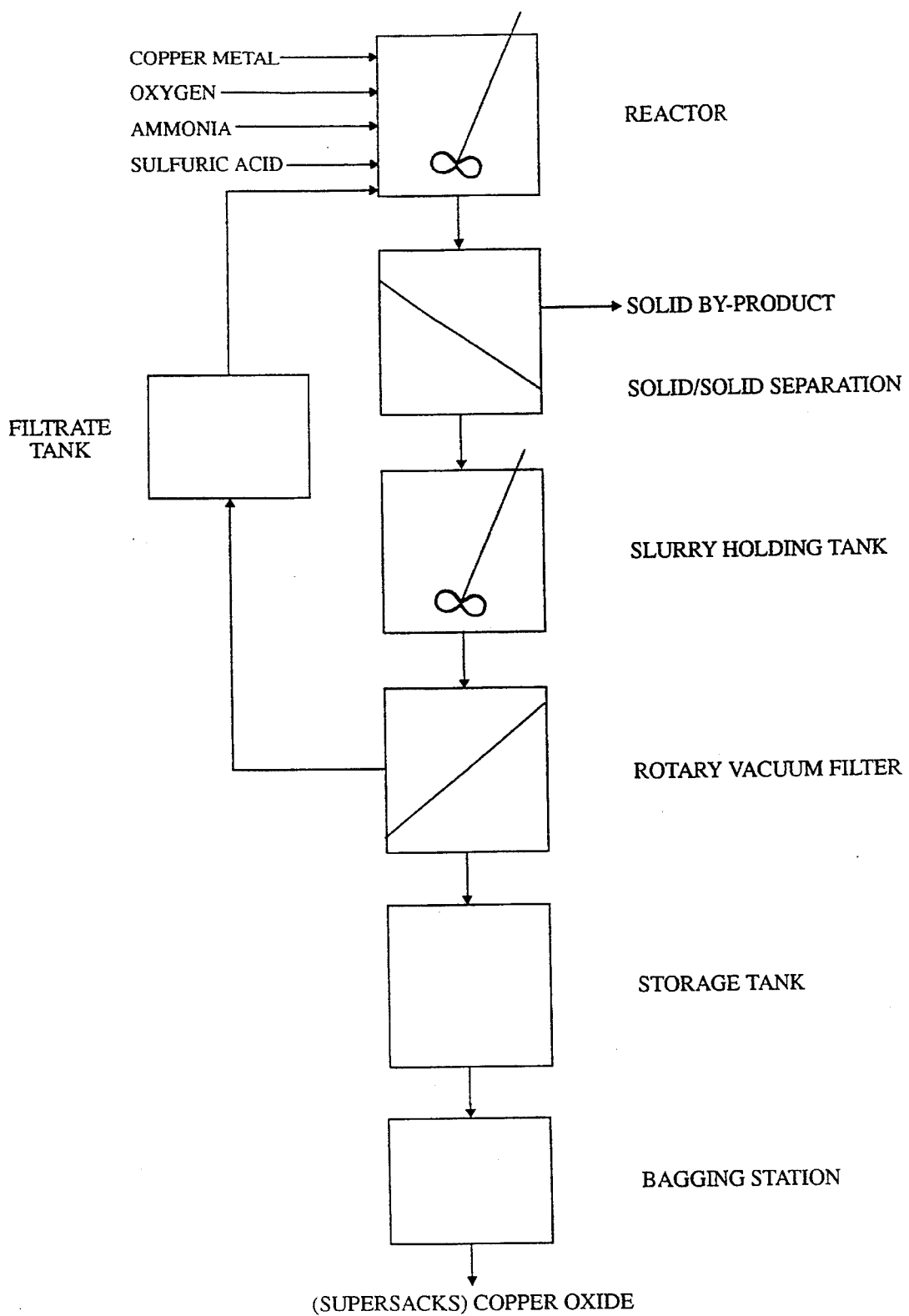
FIG. 3 is a schematic block diagram of one embodiment for a system to produce copper oxide.

A typical manufacturing scheme for the production of copper oxide using the process described herein is provided below, and illustrated in the block diagram presented in FIG. 3. Table 5 sets out the sample batch reaction conditions for this process, wherein the concentration of reactants is indicated by molar ratio.

EXAMPLE 5

Manufacturing Process for Preparation of Copper Oxide

The reactor is charged with copper through a charge port in the top of the vessel. The charge port is closed and the reactor is filled with recycled filtrate from the filtrate tank. Agitation is started and the rotational speed increased to 45 rpm. The filtrate is analyzed for sulfuric acid and ammonia concentration. Additional 29% ammonia and 93.2% sulfuric acid are added to obtain molar ratios to copper of 0.25:1 and 0.03:1, respectively.

The reactor is then heated to 95° C. with 150 psig steam. Oxygen is fed to the reactor initiating the exothermic reaction. The reaction mixture is maintained at between 100° C. and 125° C. Oxidation continues until oxygen is no longer consumed. Upon complete oxidation the reactor is cooled to 50° C.

The reactor is vented to a scrubber system while the approximately 26% copper oxide slurry is transferred to a slurry hold tank via a vibrating screen. The screen eliminates any unreacted material (by-product) from the product slurry. The by-product is collected for recycle purposes.

The copper oxide slurry is fed to a rotary vacuum filter where solid/liquid separation occurs. The copper oxide product is transferred via a screw conveyor to a storage tank. Copper oxide from the storage tank is bagged in supersacks.

The filtrate is collected in the filtrate tank from where it is recycled for future oxidations.

TABLE 5

| BATCH REACTION CONDITIONS | |
|---|---|
| PRESSURE | 20–50 psig |
| TEMPERATURE | 100° C. |
| COPPER | 1.0 |
| AMMONIA | 0.25 |
| SULFURIC ACID | 0.03 |
| OXYGEN | 1.0 |
| COPPER OXIDE | 1.0 |

Modifications and variations of the present invention for a process for the production of copper oxide will be obvious to those skilled in the art from the foregoing detailed description of the invention. Such modifications and variations are intended to come within the scope of the appended claims.

We claim.

1. A method for the production of copper oxide in a single closed vessel, comprising:

a) placing in a single vessel a mixture of:
  i) a copper bearing material
  ii) water;

iii) ammonia; and iv) an ammonium salt in a concentration that provides a production rate of copper oxide that is at least twice that of the production rate of copper oxide in the absence of the ammonium salt, b) closing the vessel, c) feeding oxygen into the vessel to contact the mixture, d) heating and stirring the mixture to a temperature of between approximately 70° and 130° C. to dissolve the copper bearing material into aqueous ammoniacal copper ion, which is then converted to solid copper oxide particles by reaction with the oxygen in the vessel: and then d) recovering the copper oxide particles;

wherein the molar ratio of ammonia to copper ranges between approximately 0.1 and 2 moles of ammonia per mole of copper metal.

2. The method of claim 1, wherein the copper oxide is of average particle size ranging from approximately 10 to 200 microns.

3. The method of claim 1, wherein the copper oxide is of particle size ranging from approximately 10 to 20 microns.

4. The method of claim 1, wherein the copper bearing material is #2 scrap copper.

5. The method of claim 1, wherein the copper bearing material is #1 scrap copper.

6. The method of claim 1, wherein the reaction is carried out at a temperature ranging from approximately 90° to 100° C.

7. The method of claim 1, wherein the reaction is carried out in a closed vessel with a partial oxygen pressure of between 5 and 55 psig.

8. The method of claim 1, wherein the molar ratio of ammonia to copper ranges between approximately 0.2 and 0.5 moles of ammonia to 1 mole of copper.

9. The method of claim 1, wherein the molar ratio of ammonium salt to copper ranges between approximately 0.005 and 1 mole of ammonium salt to one mole of copper metal.

10. The method of claim 1, wherein the molar ratio of ammonium salt to copper ranges between approximately 0.03 and 0.06.

11. The method of claim 1, wherein the ammonium salt is selected from the group consisting of ammonium acetate, ammonium fumarate, ammonium formate, ammonium neoheptanoate, ammonium maleate, ammonium nitrate, and ammonium sulfate.

12. The method of claim 1, wherein the ammonium salt is ammonium sulfate.

13. The method of claim 1, wherein the ammonium salt is ammonium acetate.

* * * * *

UNITED STATES PATENT AND TRADEMARK OFFICE
CERTIFICATE OF CORRECTION

PATENT NO. : 5,492,681
DATED : February 20, 1996
INVENTOR(S) : Eugene A. Pasek and Craig R. McIntyre It is certified that error appears in the above-indentified patent and that said Letters Patent is hereby corrected as shown below:

Column 5, line 20, delete "-1/2" and insert - - 1/2 - -

Signed and Sealed this

Fifth Day of August, 1997

Attest:

Attesting Officer

BRUCE LEHMAN

Commissioner of Patents and Trademarks